INVENTOR.
VINCE G. DEMPSEY
BY
John J. McCormack
ATTORNEY

March 24, 1970 V. G. DEMPSEY 3,502,323
MEANS FOR SENSING INDIVIDUAL DOCUMENTS
IN A CONTINUOUS CHAIN FEED
Filed Jan. 2, 1968 3 Sheets-Sheet 2

INVENTOR.
VINCE G. DEMPSEY
BY
John J. McCormack
ATTORNEY

INVENTOR.
VINCE G. DEMPSEY
BY
John J. McCormack
ATTORNEY

United States Patent Office 3,502,323
Patented Mar. 24, 1970

3,502,323

MEANS FOR SENSING INDIVIDUAL DOCUMENTS IN A CONTINUOUS CHAIN FEED

Vince G. Dempsey, Framingham Centre, Mass., assignor to Honeywell Inc., Minneapolis, Minn., a corporation of Delaware Filed Jan. 2, 1968, Ser. No. 695,177
Int. Cl. B65h *5/12, 3/06*
U.S. Cl. 271—3 20 Claims

ABSTRACT OF THE DISCLOSURE

Document handling apparatus including an "in-feed" for receiving a pack of documents in an input hopper and select-advancing them singly to a transport line; this arrangement being characterized in a prime embodiment by elements for "pre-throating" each document, i.e. advancing it through a select throat somewhat to there await subsequent picking; also elements for "flipping" the document tail out of the nominal feed path and detecting tail-passage at this time, plus related feed elements making the arrangement especially apt for high speed picking and subsequent processing of documents with practically no delay, even in a continuous, chain feed mode.

PROBLEMS IN THE PRIOR ART—INVENTION FEATURES

In the art of designing and implementing document handling apparatus especially for high speed electronic data processing, it is, of course, all-important to transport the documents such as through a reader-sorter, and process them with a minimum of delay. One common problem with such apparatus relates to the control of the inter-document gap—the spacing between successive transported documents. For instance, in equipment for reading and sorting check documents, the checks are fed from an input hopper, successively, past read and write stations, each having sensing heads (e.g. transducers for sensing MICR characters), the checks being typically sorted according to the information read and recorded thereon. When a read head has scanned the characters on such a check and the computer has digested this information, a certain time is required to process it thereafter, such as to determine whether to recirculate the check for further processing or divert it to be translated downstream for pocketing, in which latter case a certain time period is also required to select and actuate the chute blade for diverting the check into the destined pocket. For instance, the elapsed time between reading and moving such a blade can be on the order of milliseconds. Unfortunately, such a delay is relatively long in data processing parlance especially where documents are being transported at extremely high speeds; hence, such a "decision time" delay commonly requires introducing a gap between transported documents (an "inter-gap"), as workers in the art well know.

Conventional means for introducing such an "inter-gap" typically comprises a separator unit, to separate (pick) each document from the input pack and inject it to the processing train at a certain "pick-speed," and also an accelerator unit, or process transport for receiving the document at this pick-speed and accelerating it to a higher process-speed, thereby introducing a prescribed "inter-gap" while bringing it up to processing velocity. Such "differential velocity" arrangements are in common use, but unfortunately rather unreliable; e.g. with documents of varying length, the inter-document gap varies, being proportional to the length of a following document. That is, since the separator must drive a longer document for a longer time at the low pick-speed (longer picking time while the prior picked document is being accelerated) this will, of course, introduce a larger "inter-gap" separation from the preceding document. Workers in the prior art have tried to live with such defects in "differential velocity" systems by designing them to provide the minimum inter-gap necessary under "worst case" condition, i.e. when two minimum-length documents follow one another, so that the inter-gap will never fall below this minimum. But this means that in other more typical instances, the inter-gap will be unnecessarily wastefully long, causing an undesirable increase in handling time (and decrease in document throughput) degrading the performance of the apparatus. Thus, it will be evident that control over this "inter-gap" has been somewhat ineffective in many prior art arrangements; most especially so when they must handle documents of varying lengths and thickness, as is common.

Other workers in the art have attempted to use such "differential velocity" arrangements so as to minimize inter-gap waste, such as in U.S. Patent 3,025,051 to David et al. where a low speed separator unit is provided with an "over-running" clutch permitting it to slip and be accelebrated by the pull of an engaged document as it begins to be accelerated by a "take-away" roll. This arrangement attempts to maintain a constant "inter-gap" despite variations in document length and to thereby increase throughput without an increase in machine transport speed. However, as workers in the art well know, such a solution is far from satisfactory and even when it performs as intended (which is not all the time) it introduces machine elements which perform erratically, wear too quickly, and are generally undesirable and better avoided. For instance, the over-running clutch introduces its own separate problem of "over-casting" of a document during its transition from the lower-velocity to the higher-velocity transport. In "over-casting" the document is driven momentarily faster than intended until the low velocity system has decelerated to its normal velocity level. Further problems in all such differential velocity systems are that great care must be taken to guarantee that each document, irrespective of its length, is driven by a low velocity system for exactly the same period of time and over exactly the same distance—something not easy to assure. The present invention intends to meet the aforedescribed gap-control problem without the use of such problematical "differential velocity" arrangements or such problematic substitutes as over-running-clutch systems.

Thus, a prime object of the invention is to provide the aforementioned features and advantages and alleviate the aforementioned difficulties. Another prime object is to advance documents between successive transport arrangements in a manner which temporarily throws the document tail out of the normal transport path and thereby artificially introduces an inter-document gap, other than along the nominal transport path. A related object is to provide document handling aparatus and methods adapted to maintain a prescribed substantially constant gap between successive documents despite random variations in their lengths. Another object is to so do this as to increase the document throughput in the machine. Another object is to do this according to means which can vary the document gap to be all the way down to zero (no gap). Another object is to do this by a "tail-flip" arrangement which allows inter-document detection without necessitating an inter-document gap in the accepted sense, e.g. no gap along the nominal processing path, such as where chain feeding is desired.

Still another object is to provide a throated transport-separator arrangement adapted to "pre-throat" (pre-separate) documents by clearing them past the throat separator prior to picking and advancing them to a downstream process transport. Still another object is to provide such a "pre-separating" arrangement in conjunction with the aforementioned "tail-flip" arrangement and to facilitate very high speed picking with a minimum of downstream delay, also facilitating detection of the document passage without necessitating an inter-document gap. A more particular object is to provide the aforegoing features in a document reader-sorting arrangement. A more particular object is to provide these features in an optical character recognition machine without use of a differential velocity transport or other problematic means.

The foregoing and other objects, features and advantages of the invention will be apparent from the following, more particular, description of preferred embodiments as illustrated in the accompanying drawings wherein like reference indicia denote like elements.

GENERAL MACHINE ARRANGEMENT

Figure 1:
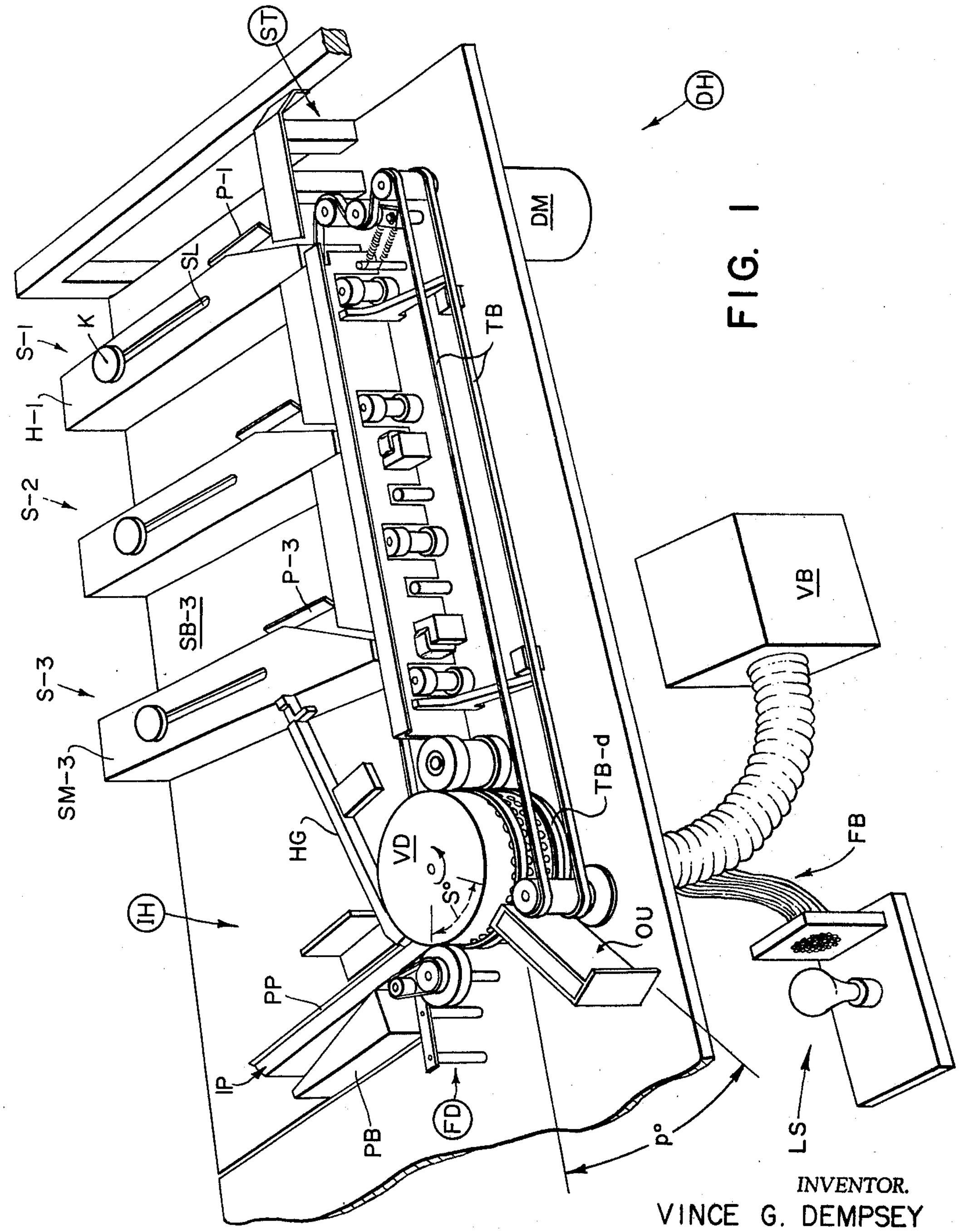
FIGURE 1 is an upper isometric view of an OCR document reading/sorting apparatus incorporating document transport and detection means according to one embodiment of the invention.

FIGURE 1 will be understood as a general schematized showing of a document-handling machine DH including three representative sort-pocket areas S–1, S–2, S–3, an input hopper IH and a number of intermediate associated document feed elements apt for employment with the invention. Thus, machine DH also includes, adjacent input hopper portion IH, an input pusher PP and a pair of front and side guide blocks (PB, HG, respectively) adapted to present a pack IP of input documents (card or like unit records) in successive feeding relation with a selectively operated picker unit FD as known in the art. It will be understood that, upon the generation of a proper "pick" signal, unit FD will be initiated to thrust the foremost document in pack IS toward (and into driven relation with) a continually rotating, vacuumatic read drum VD for transport thereby in a prescribed manner. Drum VD will be understood as adapted to sweep the documents past a read unit OU (or other processing station) (the document being recirculated by VD if desired) to thereafter be engaged by a pair of belt segments TB–*d*, to be diverted by strip unit OS and transported by sort-transport ST along sort path SP to the several sort pockets, being diverted into a designated pocket as known in the art. Of the specific elements of machine DH, portions are only generally, schematically indicated, with many parts (such as control stages, recognition logic, computer interfacing etc.) not being shown since the essence of the invention is wholly understandable without them, and since, moreover, they comprise elements well known in the art. Reading unit OU and any associated (sensing or impressions) units will be understood as operating over a prescribed arcuate processing sector $P^0$ in the document-transport path around drum VD. A conventional bank of optical detectors is schematically indicated as comprising a light source LS and an associated bundle FB of light-fibers, each conducting a light beam to a respective detector channel and its associated detect cell in unit OU, the related electronic processing means for processing the detector output being understood since it is well known in the art. Sort transport ST will be understood as relatively conventional except where otherwise indicated and including, preferably, a pair of endless-loop transport belts TB adapted to be continuously driven by drum VD or equivalent means (VD being rotated at a prescribed constant surface velocity by indicated drive motor DM). A segment of these belts is wrapped about a sector of drum VD and adapted to trap documents thereagainst and, when the documents are diverted from VD, to transport them in a conventional manner down the sort path SP to the sort-pockets S–1 etc. (for instance, driving them along between smooth guides, idler rolls and the like). Drum VD is, preferably, provided with a vacuum source (generally indicated at VB) understood as continuously operated to constantly pull transported documents against its periphery to be held thereon for processing-transport until they are diverted (by strip unit DS, only generally shown and conventional) to be advanced down the sort path SP. Each of the sort-pockets S–1 etc. may be understood as including a bed surface SB, a pusher-plate P, and adjustably-positionable stacking transport SM (here indicated within a housing H) understood as positionable by the operator along its respective stacking path for documents of various lengths, such as by thrusting with positioning knob K along a positioning slot SL.

The document-handling machine DH briefly described above may be understood as representing a typical optical character reading (OCR) system including transport means and a control unit (not shown) operable "on-line" with a typical high-speed electronic data processing (EDP) system. The transport for this OCR system may be understood as operating to provide desirable "demand feed" of documents, in continuous "chain" feed mode if desired, in a uniform high speed transport (e.g. a maximum of about 1200 "short" documents per minute; advancing them past the reading unit OU at about 100 inches per second). Such a machine DH will be understood as preferably adapted to handle an exceptionally wide range of document sizes (e.g. 4 x 3 to 8 x 4"), especially different (even intermixed) lengths according to the invention improvements. For instance, typical documents to be handle may vary in nominal dimensions:

In height—from 3–4";
In length—from 3½–8";
In thickness—from 3½–9 mils.

The character font may be understood as ASA standard for OCR ("OCR–A" font); being laid out anywhere on the document to accommodate the read head as known in the art or vice versa. Other analogous data may obviously be detected, processed, etc., such as in using a "mark-sense" unit or the like.

Such OCR systems, may be used for processing such documents as returned bills, mortgage and insurance statements, stock records, inventory and re-order forms, etc.; preferably in conjunction with a central computer system.

Some other characteristics typical of such an OCR apparatus DH are:

Input hopper capacity—about 8"
Output stacker capacity—about 4"
Transport speed—about 100 in./sec.
Distance from 1st read station to pocket decision point—about 11½"
Min. distance from pre-fed injection point to 1st read station—¼" minimum [critical: cf. *d–fr*, FIG. 2A].

FEED SYSTEM

Figures 2, 2A, 7:
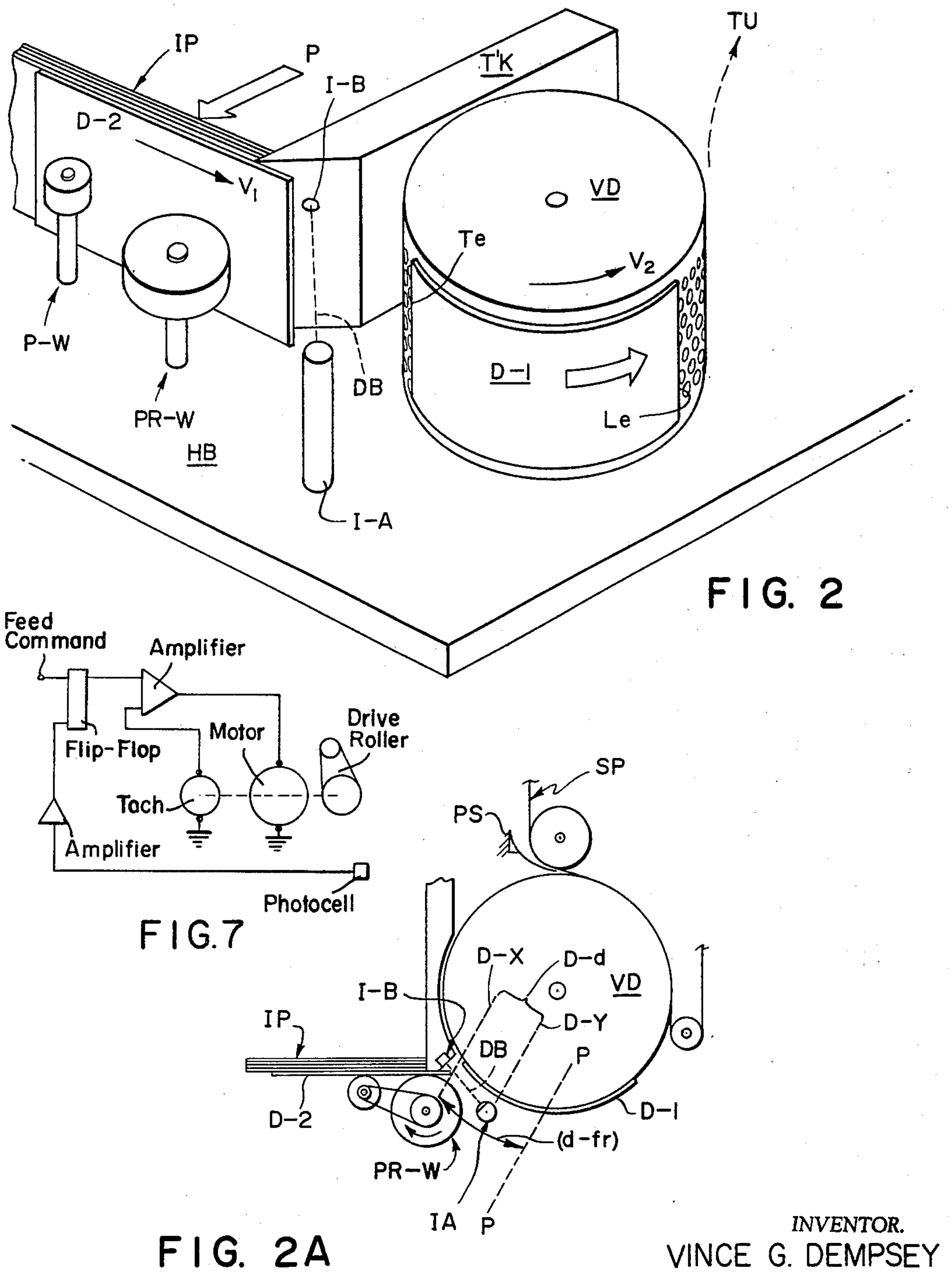
FIGURE 2 is an upper isometric enlarged view of the feed area of the arrangement in FIGURE 1, a plan view being shown in FIGURE 2A.
FIGURE 7 is a block diagram of a feed control circuit for use with the apparatus of FIGURE 5.
Figure 5:
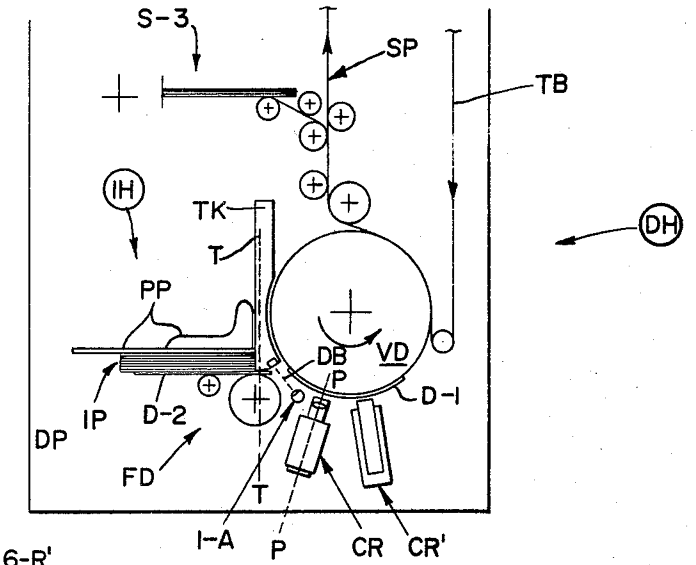
FIGURE 5 is a plan view, somewhat simplified, of some representative elements in the apparatus of FIGURE 1.

FIGURES 2 and 2A indicate details of the document feeding, detection embodiments indicated in the apparatus of FIGURE 1, while FIGURE 5 indicates, somewhat functionally, the general relation of this feeding system to some other machine elements. Thus, in FIGURE 5, one may assume that pusher plate PP portion of an input hopper IH in apparatus DH is adapted to somewhat conventionally urge the foremost document (D–2 indicated) in input-pack IP in the input hopper into driven relation with the elements of picker unit FD so as to be thrust at a prescribed "pick" time and accelerated quickly to a prescribed pick-velocity into engagement with read drum VD to be advanced for processing. According to a feature of the invention, detailed below, each document to be fed is preferably "pre-throated," i.e. "pre-fed" through the throat TH (established conventionally along throat axis T—T by locating throat knife TK so as to properly space its tip from picker wheel PR–W). The pre-feed will incrementally advance a document a prescribed amount through TH so that, thereafter upon occurrence of the next associated "pick" signal, pick drive wheels PR–W, P–W may be rotated to thrust the pre-fed document immediately onto read-drum VD at very high velocity (exactly the same as drum VD) with no "throating" needed then. Such a pre-fed condition is indicated for card document D–2 in FIGURE 5 and according to a related feature, will place the nose (leading card edge) just short of intercepting a prescribed "pick-detect" beam DB so that the initiation of "picking" will immediately interrupt this beam. According to a related, and important, feature of the invention, such a "picked" card is thereafter thrust onto drum VD and vacuumatically sucked against the periphery thereof with sufficient force so that the card tail (trailing edge) is quickly and strongly "flipped" against drum VD virtually as soon as it has cleared the feed throat TH (as illustrated for card D–1). This "tail-flip" feature may, of course, be provided by other analogous means and will be seen to have several unique advantages. Drum VD is preferably driven in synchronism to advance documents at the same surface velocity as pickers FD and sort transport ST.

However, it will be very clear to those skilled in the art that with the aforementioned "pre-throated," quick-starting pick mode, with the document so injected onto read drum VD, preferably, at the same surface velocity as VD, "document throughput" is considerably enhanced. That is, unlike prior art card handling systems of this type, only a very short distance need be traversed between picking and processing. This is illustrated in FIGURE 2A as distance *d–fr*, from the picking origin, axis D–X (along the nose of pre-fed document D–2) to the locus of processing (see initial processing axis, or OCR reading axis, P—P). Otherwise expressed, the time delay between "card pick" and "start-to-read" is reduced to a unique minimum—something extremely valuable and significant to workers in this art. Thus, an OCR (optical character recognition) read head CR may be understood as arranged along initial processing axis P—P, while a second related sensing element CR′ (mark sense head) is provided somewhat downstream thereof. These elements are functionally equivalent to processing unit OU in FIGURE 1 and may, of course, be replaced with any such document processing means.

Workers in the art will appreciate that read drum VD may thus with a minimum of delay, receive a "picked" card (such as D–2) and rush it to the initial processing station (axis P—P), transporting it therepast at a very high speed. Each card may, of course, be recirculated any number of times about drum VD where desired and will be understood as, finally, diverted by schematically shown stripper element PS (conventionally provided) to be shunted down a sorting transport path SP and, thence, be selectively diverted into a prescribed sort-pocket (e.g. illustrated pocket S–3), as is well known in the art. Transport belts TB will be understood as provided for this together with associated transport rolls, guides, etc. (indicated FIGURE 1), belts TB preferably being friction-engaged over a sector of drum VD to be driven thereby.

Turning to the particular details of the feed system in FIGURES 2 and 2A, it will be apparent that picker unit FD, comprises a pair of synchronous coupled feed wheels, namely picker wheel PR–W and pusher wheel P–W, provided both to "pre-throat" the foremost stacked card (such as indicated for card D–2 in pack IP as shown in FIGURE 5) and to thereafter "pick" the pre-fed card, thrusting it into engagement with read drum VD, accelerating it quickly up to the drum velocity $V_2$ when wheels P–W, PR–W will be driven to so "pick" a card responsive to an associated "pick signal," applied to the associated picker control (not shown, but well known in the art). This pre-select or "pre-throating" will be understood as effected by pre-feeding a document from hopper IH through a portion of throat-gap TH so that at a subsequent "pick time" its nose will be already "throated" and closer to the downstream transport (drum VD).

FIGURE 7 shows a schematic block diagram of a conventional type velocity servo system for synchronously controlling the picker drive rollers in the two phase mode described herein. Thus, upon reception of the feed command signal, the flip-flop is set and the motor is energized to pick a pre-throated card and thrust it into engagement with the vacuum drum. The card is rotated with the drum until its tail clears the card throat and flips out of the path sensed by the photocell. As the tail of the card flips, the photocell provides a reset signal to the flip-flop and opens the motor energization circuit. The delay in response to the reset signal is adjusted to enable the picker drive rollers to engage and precisely pre-throat the next card in the stack before the motor stops.

It will become apparent to those skilled in the art that such a "two phase" pick mode, whereby a document is first thrust an increment barely-through the feed throat, to be thereafter thrust beyond at "pick time," will have significant advantages. One important advantage, of course, is that according to the location of detection axis DB (which may be placed quite close to the initial processing axis P—P) the nose of the pre-throated card may thus be brought much closer than normal to the initial detection axis P—P (being pre-fed just short of detect beam DB). This is highly significant in saving transit (feed-to-read) time, with less "dead time" and faster throughput—a very significant consideration. It also reduces the risk of throat-jamming (sometimes occurring due to the accelerations of a picker wheel of this type). Further, the picker unit FD may effect this pre-feed very conveniently by simply continuing to feed the next document in pack IP after a given document has left throat TH. For instance, after feeding card D–1, the picker wheels will continue to rotate and thrust following card D–2 through throat TH into the indicated condition (just short of beam DB).

Another significant advantage to such "pre-throating" relates to the aforementioned "feed-to-read" time whereby this time is made more predictable (as well as shorter) by exactly referencing the position of a picked card. That is, it will be evident that, here, a card such as D–2, may be positioned with its nose along a set axis, such as detect beam DB. Without such "prethroating" and beam-referencing the picker would begin to drive a card from hopper IH without any good assurance of its exact starting location (e.g. cards can readily get "offset" within an input pack).

Detect beam DB may be effected by arrangements known in the art; for instance, by a light source IA (e.g. a lamp suitably focused, of the proper wavelength, etc.) directed into conventional sensitizing registry with a photodetector IB, the latter being shown as conveniently embedded in the trailing face of throat knife TK. These elements thus establish a prescribed "oblique" orientation of detect beam DB with the "nominal" card-transport-path, as mentioned below.

As aforementioned, it is a significant feature of the invention that read drum VD can, itself, effect "tail-flip" of engaged documents when they leave throat TH. That is, drum VD may conveniently include a sucking, vacuumatic system (operating conventionally through ports sucking along a prescribed transport sector ($S^0$) of the drum periphery, as known in the art) so that, as a fed card is thrust by picker drive FD to engage the drum periphery, this vacuum will quickly suck the card in against the ported drum face and, when the tail of the fed card is "free" (e.g. has "cleared" throat TH), it will be immediately "flipped," out of its normal transport path, against the drum periphery. This is indicated for document D–1 in FIGURE 2A which may be assumed as having been "just-flipped," out of the "nominal path" (i.e. transport path of its nose). This card D–1 is shown in "chain" (nose-to-tail) relation with following card D–2, that is, no inter-card gap is, as yet, established along the "nominal path"—through an oblique, detect-gap has been established by the tail-flips.

In connection with this feature, it is important to bear in mind that a conventional arrangement for detecting passing document edges (e.g. card tail) would be expected to establish an *orthogonal* detecting beam, transverse this nominal transport path, such as along orthogonal axis T—T in FIGURE 5, and not oblique thereto, as for beam DB. Thus, workers in the art will appreciate that, when a pair of successively-fed cards (such as D–1, D–2) would pass this conventional axis T—T in nose-to-tail relation, the control of such things as inter-card gap distance, etc. becomes very much more difficult than with the arrangement nidicated in FIGURES 2, 2A according to the invention. For instance, the conventional arrangement affords virtually no possibility of keeping documents nose-to-tail (where "inter-gap" becomes essentially nil), since *some* gap along the "nominal path" is typically necessary to admit a detecting beam. Moreover, a certain amount of time is typically necessary to receive and process the signal and actuate related controls as above indicated. By contrast, it will be seen that the arrangement in FIGURES 2, 2A which both disposes the detecting beam DB oblique to the transport path and also includes a tail-flip station, acts to open up the tail-detecting zone artificially, easily facilitating tail-detection without necessarily establishing an "inter-gap" (along the nominal path). Thus, this feature artificially creates a certain amount of space and time for document detection, processing, etc. (until the nose of the following card intercepts the beam etc.) without carving it out of the "nominal path" or necessitating any "inter-gap" (in the accepted sense).

Such tail-flip arrangements compare favorably with analogous control means used heretofore in continuous feed systems which have employed very different gap generating means, such as the "differential velocity" transport. As aforedescribed, such differential velocity arrangements require that the upstream and downstream transport means operate at different, carefully controlled, velocities to establish the inter-gap, maintaining this gap to be constant being somewhat difficult and controlled variance of the gap being even more difficult. Of course, positive sensing of the "inter-gap" is required to incorporate a "demand feed" with a fixed prescribed gap. With the invention, individual documents may be demand-fed from a system in successive nose-to-tail relation and tail-sensed thewhile, where this was impractical heretofore.

In operation, the documents are accelerated to a prescribed high speed and fed from the input hopper to a downstream transport operating at the same speed. The tail (trailing edge) of the document fed is "flipped" (i.e. laterally displaced out of the "nominal path") to momentarily, and artificially, establish the "inter-gap." This gap is sensed photoelectrically and the resultant signal used to control the feed system, such as stopping the feed of the following card before it can enter the continuously-running transport system (e.g. arresting card D–2 in its illustrated position in FIGURE 5). This tail-flip can be effected very readily with a suction system, such as the one already used on read drum VD, to offset the tail out of the normal path, at a prescribed flip-zone. Of course, other means, such as a purposeful "jog" in the transport path (e.g. in combination with the inherent restoring stiffness of the document itself—see below re FIGURE 4), gas jet means or the like can also produce this flipping, and workers in the art can visualize conventional means for implementing it.

A tail-flip/tail-detect system of the type described is particularly apt for usage with a transport arrangement that operates in a "chain mode" (nose-to-tail advancement) since prior art systems find chain-feeding a problem. The individual-document sensing at such a "flip-zone" will provide unique flexibility in selectably controlling how the following documents are fed. For instance, "differential velocity" systems, conventionally used to satisfy demand feeding cannot provide a chain-feed. Other systems require adjustments for transporting different document lengths, where none is required with the invention. The feeding system of the invention also has the advantage of reducing system-complexity over prior art systems. Acceleration devices such as pinch rolls, "take-away" rolls etc. and cumbersome couplings, such as over-running clutches may be eliminated. Running of the feed system in the initial low velocity mode of a conventional "different velocity" separation arrangement is eliminated. A fixed gap can be maintained between documents, even where long and short documents are fed intermixed! Thus, maximum document throughput and a miniminum "feed-to-read" time (delay) is achieved for any given length document and selected transport velocity.

Figures 3, 4:
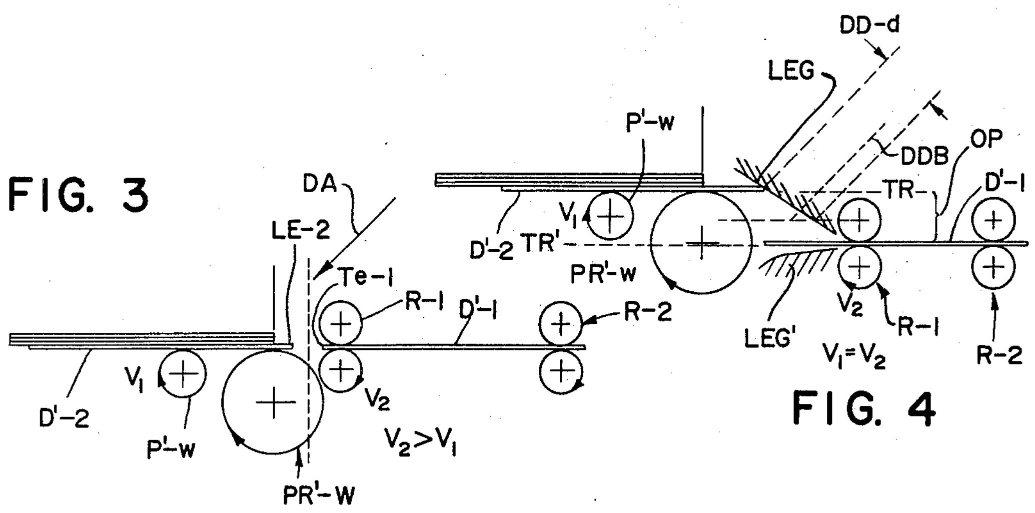
FIGURE 3 is a very schematic, plan view of a document-feed, detection arrangement illustrative of characteristics of prior art arrangements.
FIGURE 4 is a very schematic plan view of a document transport, detection arrangement illustrating characteristics according to the invention.

The foregoing distinctions over prior art systems may be clarified by reference to FIGURES 3 and 4. In FIGURE 3 a rather generally indicated document-feeding transport system is very schematically indicated as including a pair of advance rollers PR′–W, P′–W (generally analogous to rollers P–W, PR–W above), being adapted to thrust documents (such as card D′–2 shown) along a prescribed rectilinear path into engagement with downstream transport means (generally indicated by roller pairs R–1, R–2, shown driving downstream card D′–1). To detect the passage of (leading and trailing) card edges, detection means, defining a detection beam DA, are understood as included, for instance, to control the rotational motion of wheels P′–W, PR′–W to effect a prescribed inter-card gap along the transport path. For instance, this may be done by detecting the passage of document tail (trailing edge TE–1 of document D′–1) along DA and stopping wheels P′–W, PR′–W to hold the following nose (leading edge LE–2 of following document D′–2) aligned relatively along axis DA for a prescribed period, sufficient to effect the desired gap distance (assuming a prescribed document velocity $V_2$ imparted by rolls R–1, R–2). Another very common mode of introducing such an inter-card gap is by a "differential velocity" system whereby the downstream transport means (here rollers R–1, R–2) is operated to effect a higher document velocity (thus velocity $V_2$ will be greater than velocity $V_1$ imparted by the downstream transport elements P′–W, PR′–W), this velocity-differential serving to establish the inter-card gap. Another shortcoming of this arrangement is that such "orthogonal" detection systems (detect axis DA being relatively transverse the nominal transport path) necessitate the creation of some finite inter-document gap to facilitate practical photo-detection; as opposed to the invention, which can detect documents even when nose-to-tail (zero gap).

On the other hand, in the very schematic embodiment indicated in FIGURE 4, no such differential velocity is used or needed. Here, the document transport elements are very schematically indicated and analogous to transport units *P′–W/PR′–W* and *R–1/R–2*, except that both advance documents at the same velocity ($V_1=V_2$). Here, it will be understood that the upstream transport (wheels P'–W, PR'–W) thrust stacked documents, such as D'–2 or the like, somewhat obliquely against a fixed, low-friction diverting-guide surface LEG so as to divert them from their original nominal transport path TR obliquely into an "offset" transport path TR', which is offset a prescribed orthogonal distance OP from this original path. (All the guiding means are not shown, but will be understood as conventionally implemented by means well known in the art.) Arranged along the offset inter-path DD–*d* is a card detection axis DDB which is oriented oblique to both primary transport paths, TR, TR'. Axis DDB may be understood as functionally the same as analogous detect axis DB in FIGURES 2A, 2 and 5. It will be apparent to those skilled in the art that such an oblique detecting arrangement, together with the offset transport means (analogous to the aforementioned tail-flip means) will facilitate the detection of document tails as they are transported at a prescribed constant velocity (e.g. along a path including transport paths TR, TR' etc.) without requiring the introduction of any inter-document gap and without need for any problematical transport elements, such as the aforementioned differential velocity arrangement, an over-running clutch, etc. Thus, following cards D'–1, D'–2 shown may be kept in a "chain" relation, as indicated, while the transport still affords a substantial inter-card detection distance (and detection time), while each tail passes between the two primary transport paths (i.e. along path DD–*d*). The flipping of the tail of the leading card D'–1 in FIGURE 4 may be assumed as having just been completed (e.g. responsive to its inherent stiffness) and the interruption of detect axis DDB by the following nose (of card D'–2) not yet begun. Here, detect time may be occurring during the transit of a card nose along path DD–*d* until intersecting DDB. Such an arrangement will, of course, also allow the control of inter-document gaps in a wide variable range all the way down to "zero gap"—something not practical in prior art devices. Further, it will enable each document to be detected, counted, etc. while being fed in a continuous chain with no "inter-gap." Of course, here, as before, the invention teaches introducing a detect axis non-orthogonal with the normal feed-plane (transport-path TR, TR'), but teaches, further, that the detect axis need not even intersect the nominal transport path at all.

Figure 6:
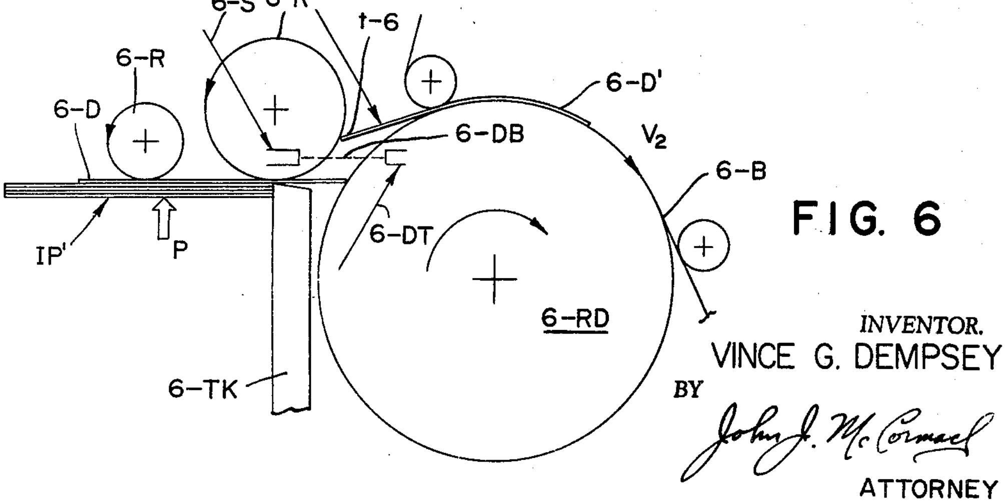
FIGURE 6 is a schematic plan view after the manner of FIGURE 2A of an alternate document feed, detection arrangement according to a modified embodiment of the invention.

FIGURE 6 illustrates another alternate embodiment for demand feeding cards, preferably in a chain mode (or, if desired, with any other fixed inter-card gap). Such a demand-feed will, as usual, be asynchronous of any other machine elements, thus being initiate-able "on-demand." An input document pack IP' will here be understood as registered against a throat knife 6–TK, being urged by a pusher means (P) into picking engagement with a pair of picking wheels 6–R, 6–R' so that the foremost document (6–D indicated) is thrust into contact with a continuously rotating read drum 6–RD to be advanced along its periphery and engaged by passing resilient transport belt 6–B for transport downstream as known in the art. Except for the modifications below described, these elements will be understood as constructed and operating the same as the foregoing analogous elements, such as in FIGURES 1 and 2. Here, it may be understood that the picker wheels 6–R, 6–R' are operated at a prescribed pick velocity ($V_P$) while read drum 6–RD and associated transport belt 6–B are operated at a substantially greater velocity ($V_R$) such that the differential between the two ($dV$) will automatical establish a prescribed gap between the following cards along drum 6–RD etc. However, unlike conventional "differential-velocity" systems, and according to an invention feature, this transport drive is so arranged that the tail *t* of a fed document is allowed to "flip" out of the nominal transport path (about the periphery of drum 6–RD), as indicated for tail *t*–6 of document 6–D', so as to, then, create a prescribed artificial gap separation from the following documents in the chain feed (e.g. separation from the nose of document 6–D, assuming 6–D is fed to substantially abut tail *t*–6). Further, a prescribed detection arrangement along the indicated detection axis 6–DB is provided (defined by prescribed source and detector elements 6–S, 6–DT, respectively) at this flip-zone, according to this feature. Thus, here, as in the foregoing embodiments, the artificial introduction of a flip-zone and associated detect-gap permits card edge detection without affecting the transport mode (e.g. without necessitating the interruption of a chain feed).

Such an arrangement will be seen as highly advantageous in the art. For instance, document skew, and like misalignment caused by differential velocity between transports can be effectively eliminated. Such skew will be recognized as typically resulting when the acceleration (differential velocity) forces of the downstream, higher-speed transport (e.g. R–1 etc., FIGURE 3) is for some reason (such as lateral card mislocation) torque-engaged with the driven card, tending to twist it. For instance, variation in card height will offset a single advance-roll from its normal center-of-gravity contact with a driven card (off-center contact), thus introducing an overturning moment, obviously upsetting the transport scheme. For instance, as a card tail flips (e.g. *t*–6) and the artificial gap is introduced and detected at 6–DT, the picker wheels 6–R, 6–R' could then be uncoupled (de-clutched electrically from their driver) for a prescribed time, corresponding to the desired inter-card gap, then being re-engaged to pick and advance the following card. This scheme would eliminate "document slip" which is problematical in prior art devices when a high speed feed (e.g. 6–RD) is coupled to a low speed feed (e.g. 6–R') through the card (i.e. while both engage it—cf. patent aforementioned). It would also reduce the risk of skew as the card is withdrawn from the grip of wheels 6–R, 6–R' at an increased velocity (e.g. snatched by drum 6–RD) involving an asymmetrical drag like the aforedescribed off-center contact.

Workers in the art will thus recognize many novel features and advantageous, unexpected results from the foregoing. They will appreciate that, using tail-flip/detect arrangements like those taught, a machine can, as it were, "anticipate" a document tail; detecting its passage upstream of the usual location and signal the approach of a tail before it passes the conventional detection point (while the document is still in transit). Also, documents may be passage-detected regardless of the pressure, or size, of any inter-gap—even tolerating a continuous chain feed (e.g. where no sort-pocket selection is employed). Here, a tail-flip technique is taught for introducing a detect-gap between documents (momentarily) without introducing a "transport gap" along the nominal card-path. Significantly, such a system, when including a pre-feed mode, allows one to locate a read head much closer (e.g. order of 2) in space (and time) to a picker throat and thus minimize pick-read delay, speeding up the reading of successive cards. Workers will value the design freedom afforded due to the elimination of dependence upon differential velocity transports.

In summary, it will be apparent to those skilled in the art that a novel advantageous arrangement has been taught for transporting documents and particularly for introducing an artificial gap between successive documents by momentarily diverting the document tail out of the normal transport path for detection thereof and/or for complete control over inter-document gap distance (all the way down to zero gap); and wherein, for a throated arrangement, documents are "pre-separated" by throating them prior to downstream advancement. Moreover, it will be apparent that while the foregoing embodiments have been provided to clearly teach the principles of the invention as claimed and indicate how they may be implemented, various other equivalent implementations may be employed within contemplation of the present claims. For instance, the upstream and downstream transport means (such as the indicated picker wheels and vacuumatic read drum) may obviously be replaced by equivalent transport means. Similarly, the indicated suction means for flipping the document tails may be replaced by equivalently operating diverter means where appropriate, such as a properly directed gas jet. It will also be apparent that the principles of the invention may be applied to other analogous document transport arrangements, such as those not involving pickers per se. It will also be apparent that features of the invention, alone or together, can be applied to improve other document selection arrangements than those indicated. The invention features may also be applied to documents other than those shown, that is, any unit records having the problems and characteristics of the type aforementioned.

While in accordance with the provisions of the patent statutes, there have been illustrated and described the best forms of the invention known, it will be apparent to those skilled in the art that changes may be made in the forms of the apparatus disclosed without departing from the spirit of the invention and that in some cases, certain features of the invention may be used to advantage without a corresponding use of other features.

Having now described the invention, what is claimed as new and desired to secure by Letters Patent is:

1. A document translating arrangement having an upstream transport and a downstream transport for driving documents along a prescribed normal path for each transport at predetermined intervals, the upstream transport being arranged to translate documents singly, over a prescribed transition zone to the downstream transport, the improvement therewith comprising:

means for sensing said documents as they traverse a prescribed segment of said transition zone, and means for dislocating said documents out of one of said normal paths into the other to provide a signal to said document sensing means.

2. The combination as recited in claim 1 wherein said dislocation means and sensing means are adapted and arranged to enable the detection of document passage with a detect means which does not intersect either normal path and which facilitates control of document handling independent of inter-document spacing and/or of document velocity along these paths.

3. The combination as recited in claim 2 wherein said upstream and downstream transports are arranged to drive documents at relatively the same velocity and wherein said detect means is adapted to sense a passing document edge, this arrangement not requiring any inter-document gap along the normal paths.

4. The combination as recited in claim 1 wherein said dislocation means attracts the trailing portion of said documents out of the normal paths to thereby introduce an artificial spacing between documents without affecting the interdocument spacing or the document velocity along the normal paths.

5. The combination as recited in claim 4 wherein said upstream transport comprises an in-feed arrangement including a throat separating constriction; and wherein said downstream transport is operatively associated with a cooperating tail-flip means adapted to so divert the document tail out of the normal path when it clears the said constriction.

6. The combination as recited in claim 5 wherein said downstream transport is operated to impart a higher document velocity than said upstream transport; and wherein said sensing means comprises a trailing-edge detect arrangement defining a detect beam intersecting the zone of this tail-flip.

7. The combination as recited in claim 5 wherein said transports impart relatively the same document velocity.

8. The combination as recited in claim 7 wherein said tail-flip means is adapted to so flip document trailing portions under the influence of gas pressure across the flip zone.

9. The combination as recited in claim 8 wherein said downstream transport comprises a vacuum suction drum presenting a suction to pull documents onto the surface thereof, adjacent the intersection of its surface with the said transition zone, this suction also functioning to provide the said gas pressure for tail-flip purposes.

10. The combination as recited in claim 9 wherein said in-feed arrangement includes a picker means and said throat separating construction.

11. The combination as recited in claim 7 wherein said document sensing means comprises a trailing edge detect arrangement adapted to detect the passage of a document tail across the flip zone.

12. The combination as recited in claim 11 wherein said trailing edge detect arrangement provides an electrical signal to selectively control the transport of following documents by said upstream transport means.

13. The combination as recited in claim 12 wherein said in-feed arrangement includes a picker means and said throat separating constriction; and wherein said detection arrangement comprises a photoelectric beam arranged to detect a flipping document tail and to responsively control the spacing therefrom of the following document nose along the normal downstream path.

14. The combination as recited in claim 13 wherein said in-feed arrangement also includes an input hopper and associated picker roll adapted to thrust documents through said throat constriction at the same velocity as imparted by said suction drum.

15. The combination as recited in claim 14 wherein said picker roll is controller to pre-inject documents from said hopper a prescribed constant increment toward said downstream transport so as to "pre-throat" them and register them along a prescribed "start-axis" for subsequent translation into engagement with the downstream transport.

16. In a document-translation arrangement including an upstream transport, a downstream transport, and an intermediate mid-transport adapted to feed documents between said upstream and downstream transports in a prescribed manner across a transition zone, responsive to prescribed feed signals, the improvement therewith comprising:

control means adapted to assure a constant registration of documents upon the initiation of this upstream/downstream feeding including means for controlling said mid-transport so as to initiate said feeding and maintain it continuously, only stopping when documents are registered at a prescribed "start-axis" along the transition zone, being also adapted to thereafter initiate translation of a document, which has been arrested along this axis, to the downstream transport, responsive to a respective feed signal associated with that document, being further adapted to continue operating to register a following document from said upstream transport at the said "start-axis" for subsequent translation thereof responsive to an associated feed signal, and so forth.

17. The combination as recited in claim 16 wherein said control means comprises also a detect means arranged to refine a prescribed detect beam across said transition zone for so controlling said mid-transport means.

18. The combination as recited in claim 17 wherein said upstream transport comprises an in-feed assembly including an input hopper for receiving a stack of documents in prescribed alignment and a separating throat constriction; and wherein said mid-transport comprises a picker drive adapted to thrust documents from said hopper through said throat constriction, and beyond, to register their leading edge along said start-axis so as to be "pre-throated" for initiation of picking from a constant prescribed location that is spaced a constant reference distance from said downstream transport.

19. The combination as recited in claim 18 wherein said detect means comprises a photoelectric detection system adapted to detect a trailing document edge.

20. The combination as recited in claim 19 wherein document dislocation means are additionally provided along the transition zone and adapted to flip the trailing portion of each document out of its normal path, this path being defined by transit of its nose across said transition zone, the locus of this flip action being arranged to include said photoelectric beam whereby subsequent document handling apparatus may be controlled responsive to signals from said detect means.

References Cited

UNITED STATES PATENTS 3,304,080 2/1967 Greenblott ----------- 271—3

RICHARD E. AEGERTER, Primary Examiner

UNITED STATES PATENT OFFICE
CERTIFICATE OF CORRECTION

Patent No. 3,502,323

March 24, 1970

Vince G. Dempsey

It is certified that error appears in the above identified patent and that said Letters Patent are hereby corrected as shown below:

Column 12, line 11, "construction" should read -- constriction --; line 64, "refine" should read -- define --.

Signed and sealed this 22nd day of December 1970.

(SEAL)
Attest:

Edward M. Fletcher, Jr.
Attesting Officer

WILLIAM E. SCHUYLER, JR.
Commissioner of Patents